US007014724B2

(12) United States Patent
Frezza et al.

(10) Patent No.: US 7,014,724 B2
(45) Date of Patent: Mar. 21, 2006

(54) GRAVITY REGULATED METHOD AND APPARATUS FOR CONTROLLING APPLICATION OF A FLUID

(75) Inventors: Michael E. Frezza, Sarnia (CA); Raymond A. Phillips, Smith Creek, MI (US)

(73) Assignee: Lear Corporation, Southfield, MI (US)

( * ) Notice: Subject to any disclaimer, the term of this patent is extended or adjusted under 35 U.S.C. 154(b) by 204 days.

(21) Appl. No.: 10/603,964

(22) Filed: Jun. 25, 2003

(65) Prior Publication Data

US 2005/0037148 A1 Feb. 17, 2005

(51) Int. Cl.
*B32B 31/12* (2006.01)

(52) U.S. Cl. ............................ 156/64; 156/578; 427/9; 427/8

(58) Field of Classification Search .................. 156/64, 156/578; 427/8, 9; 118/693; 222/55, 56, 222/58, 64
See application file for complete search history.

(56) References Cited

U.S. PATENT DOCUMENTS 4,052,003 A 10/1977 Steffen
4,277,832 A 7/1981 Wong
4,697,607 A 10/1987 Aalto et al.
4,856,456 A 8/1989 Hillman et al.
5,199,992 A 4/1993 Hines et al.
5,263,608 A 11/1993 Kiernan et al.
5,499,198 A 3/1996 Gaidos et al.
5,670,211 A 9/1997 Huber et al.
5,685,911 A 11/1997 Raterman et al.
5,964,418 A 10/1999 Scarpa et al.
6,136,379 A 10/2000 Scarpa et al.
6,139,639 A 10/2000 Kitamura et al.
6,149,071 A 11/2000 MacCallumMhor et al.
6,256,597 B1 7/2001 Wang et al.
6,348,098 B1 2/2002 McLoughlin et al.
6,374,160 B1 4/2002 Forjahn
6,416,582 B1 * 7/2002 Falck et al. ................. 118/679
6,477,446 B1 11/2002 Holtmann et al.
2002/0020350 A1 2/2002 Prentice et al.
2002/0048212 A1 4/2002 Hill et al.
2002/0095225 A1 7/2002 Huang et al.

* cited by examiner

*Primary Examiner*—George Koch
(74) *Attorney, Agent, or Firm*—MacMillan, Sobanski & Todd, LLC

(57) ABSTRACT

An apparatus for dispensing an amount of fluid is disclosed where the amount of fluid and the pressure thereof is controlled by the height of the fluid relative to the spray mechanism that can dispense the fluid. A reservoir is positioned above the spray mechanism such that a column of fluid constitutes the reservoir of fluid. The height of the fluid reduces upon actuation of the spray mechanism. A controller detects the initial height of fluid and the height of the fluid after the dispensing operation to determine the amount of fluid dispensed. The controller is programmed with a parameter for the amount of fluid to be dispensed. If the determined amount of fluid dispensed is not within the parameters, the controller operates an iterative process to refill the reservoir to an amount such that during subsequent spraying operations, the amount dispensed approaches the parameter amount of fluid.

20 Claims, 3 Drawing Sheets

GRAVITY REGULATED METHOD AND APPARATUS FOR CONTROLLING APPLICATION OF A FLUID

BACKGROUND OF THE INVENTION

This invention relates in general to a method and apparatus for controlling a fluid for a discrete/pulse dispensing application.

The present invention relates to an interior panel for a vehicle, and in particular to a headliner. A headliner typically consists of various layers or plies, such as a stiffening and silencing layer. Such layers can be formed, at least, of a rigid carrier layer which is integrated into the vehicle interior panel. Moreover, the interior panel typically further consists of at least one decorative layer and an intermediate shock-absorbing layer. Such an interior panel with an integrated stiffening and silencing layer may, in particular, be designed as an acoustic headliner when used as a roof liner. The interior panel is typically prefabricated and is mounted at a corresponding place of the vehicle, such as the interior of the vehicle roof. However, such a special construction of the roof liner is not needed according to the invention.

The process of forming a vehicle or automotive headliner typically includes cutting a thin sheet of polyurethane foam and coating the foam with a reactive component in a liquid state which polymerizes to form a polyurethane which stiffens the substrate. Multiple layers (or plies) may be so coated and pressed together to provide a desired stiffness. Another method includes a liquid or multiple reactive components in liquid form being sprayed onto a sheet of material as it passes on a conveyor. Still another method is roll coating, wherein sheet material is fed between rolls which are coated with a liquid which transfers the coating onto the workpiece. Roll coating is not necessarily a separate method, but can be used in conjunction with a spraying apparatus. For example, roll coating applies one of the chemical agents and spraying applies a second agent.

In the manufacture of automotive headliners using a spray coating method, there has been a need to control the "catalyst" that is applied to the manufacturing process. The term "catalyst" is generically used to describe the polyurethane catalyst that is used in conjunction with polyurethane adhesives to collectively form a bond between the various plies of an automotive headliner. Controlling the amount and spray pattern of catalyst has been a difficult task. Typically, the catalyst application process requires very low pressures for very short time intervals. For example, a catalyst could be dispensed at about 5 p.s.i. for a relatively short period of time (on the order of seconds), and then the apparatus would be turned off for a relatively longer period of time (on the order of about one minute). It would be typical for an on/off cycle to comprise a total of one minute, with the "ON" time equaling a few seconds and the "OFF" time equaling the remaining time.

Historically, the dispensing pressure of a fluid in a dispensing apparatus has been controlled by a mechanical (spring and diaphragm) pressure regulator. Such regulators have shortcomings when used for controlling pulse fluid applications. For example, regulators "creep", which means that during periods of inactivity (such as the exemplary relatively long "OFF" time) there is a tendency for the regulator to pass fluid and build downstream pressure. This is because regulators are best equipped to operate in a continuous flow situation. Regulators can also be unreliable at the low operating pressures required for intermittent spraying operations because regulators have an inherent quality of operating with a fluctuating pressure. Thus, an apparatus that is more precise at low pressure would be advantageous for the application of a catalyst. Regulators can also have a slow response time to an actuation signal. Additionally, when flow amount is based only on pressure and flow opening, the actual amount of material dispensed is not measured. Thus, a more accurate apparatus for determining and controlling an amount of catalyst/fluid dispensed would be beneficial. Regulators also eventually wear out after prolonged use. Finally, traditional regulators offer no vent for bubbles or gases entrained in the fluid to escape.

Therefore, for in order to limit the shortcomings of using regulators in a catalyst dispensing system, and to obtain the advantages described above, it would be beneficial to implement a novel method and apparatus for dispensing a catalyst/fluid.

SUMMARY OF THE INVENTION

This invention relates to an apparatus for dispensing an amount of fluid where the amount of fluid and the pressure thereof is controlled by the height of the fluid relative to the spray mechanism that can dispense the fluid. A reservoir is positioned above the spray mechanism such that a column of fluid constitutes the reservoir of fluid. The height of the fluid reduces upon actuation of the spray mechanism. A controller detects the initial height of fluid and the height of the fluid after the dispensing operation to determine the amount of fluid dispensed. The controller is programmed with parameters for the amount of fluid to be dispensed. If the determined amount of fluid dispensed is not within the parameters, the controller operates, in an iterative process, to refill the reservoir to an amount such that during subsequent spraying operations, the amount dispensed approaches the desired parameter amount of fluid.

Various objects and advantages of this invention will become apparent to those skilled in the art from the following detailed description of the preferred embodiment, when read in light of the accompanying drawings.

DETAILED DESCRIPTION OF THE PREFERRED EMBODIMENTS

Figure 1:
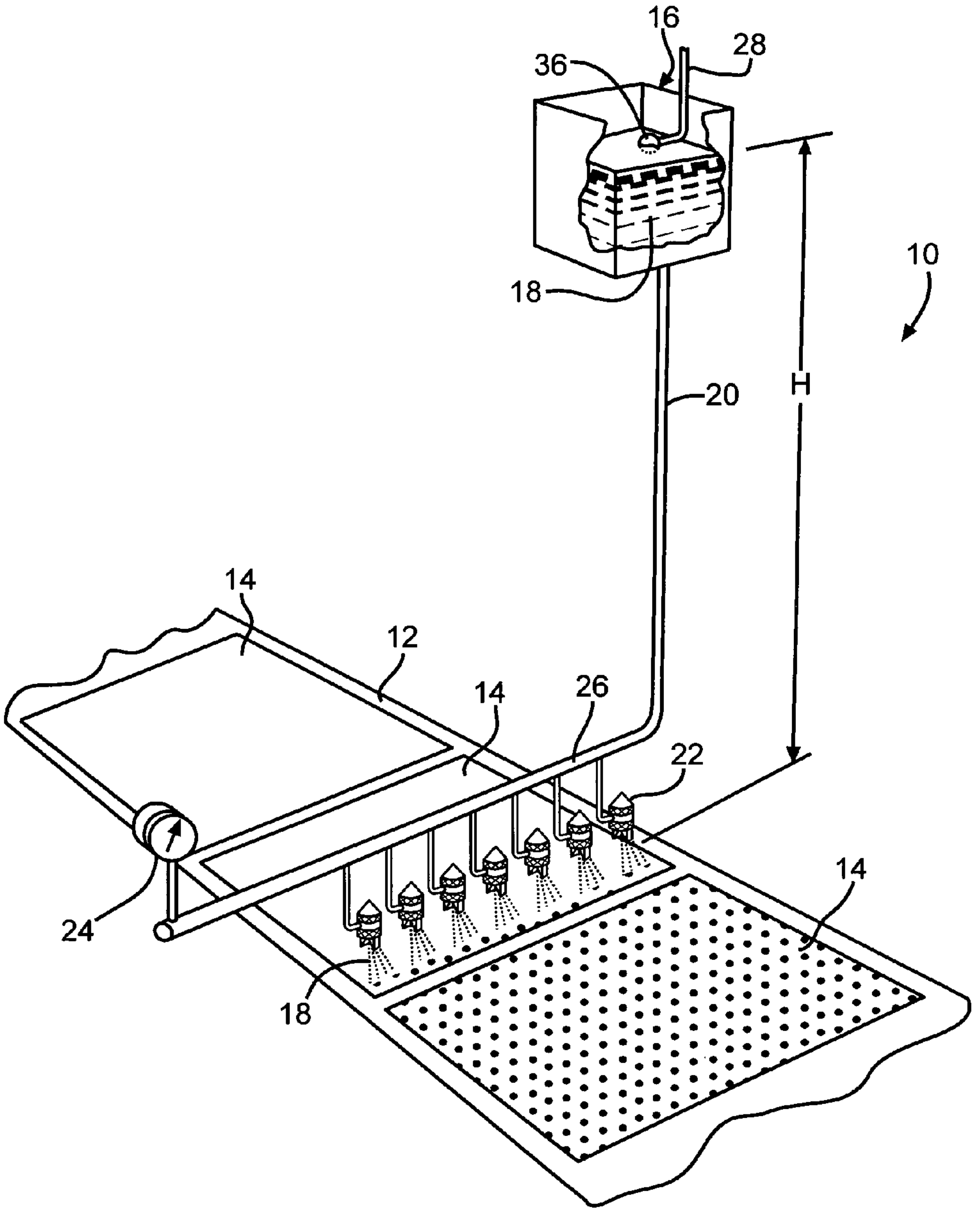
FIG. 1 is a perspective view of a fluid dispensing apparatus according to a first embodiment of the invention.

Referring now to the drawings, there is illustrated in FIG. 1 a diagram of the first embodiment of the fluid dispensing apparatus, indicated generally at 10, according to the invention. A conveyor line 12 is used with the apparatus 10 to move a workpiece 14 into contact with the apparatus 10. The conveyor 12 can also be used to move multiple workpieces 14 (or a continuous generally elongated workpiece) into contact with the apparatus 10 for mass production of workpieces 14. The apparatus 10 includes a reservoir 16 that contains a volume of fluid 18. The reservoir 16 has a supply line 28 connected to a source of fluid (not shown, but can be embodied as a supply tank, for example) that is adapted to replenish the reservoir 16 with fluid 18 based on the desired parameters of the dispensing operation (described below). The reservoir 16 is also connected by a feed line 20 to at least one spray mechanism 22. The spray mechanism 22 can be a spray gun, nozzle or any other type of dispensing apparatus. Preferably, and in order to cover a larger area of a workpiece 14, there are a plurality of spray mechanisms 22 connected to the feed line 20. The feed line 20 is preferably also connected to a generally straight spray pipe 26 that is positioned over the conveyor 12. The spray mechanism 22 is preferably positioned along the spray pipe 26 such that the feed line 20 supplies the fluid 18 through the pipe 26. The pipe 26, and thus the spray mechanism 22, is preferably positioned over the conveyor 12 and a workpiece 14 such that when the apparatus 10 is activated, the spray mechanism 22 dispenses the fluid onto a workpiece 14. Located at one end of the pipe 26 is an optional low pressure gauge 24 for monitoring the pressure at the discharge end of the spray mechanism 22.

The operation of the apparatus 10 for dispensing a fluid will be described next. The reservoir 16 is initially filled with a volume of fluid 18. In this embodiment, the reservoir 16 is open to the atmosphere and thus, is subject to atmospheric pressure. An advantage of having the reservoir 16 open to the atmosphere is that any entrained bubbles in the fluid 18 can be vented out. With the fluid reservoir 16 elevated, the height of the reservoir 16 (and fluid 18) will cause the pressure felt at the spray mechanism 22 (and pressure gauge 24) to vary with the fluid height. It is anticipated that the spray mechanism 22 will be opened only for a given period of time. The period of time the apparatus 10 is dispensing fluid will vary depending upon the application the fluid dispensing apparatus 10 is being used for. In the illustrated example, a plurality of workpieces 14 pass by the spray mechanism 22 on the conveyor 12. The spray mechanism 22 will dispense fluid 18 for the period of time that the workpiece 14 is passing under the spray mechanism 22 and will then shut-off when the workpiece 14 has passed by the mechanism 22. Therefore, it is preferred that the spray of fluid 18 will only be on when the workpiece 14 is under the spray mechanism 22 so that the fluid 18 is dispensed only onto the workpiece 14 and not onto the conveyor 12. The apparatus 10 can be activated manually when a workpiece 14 is properly aligned under the spray mechanism 22, or can be automated and include the use of an infrared or other type of triggering system to indicate proper alignment of the workpiece 14. The period when the mechanism 10 is active versus inactive will be a function of at least the physical characteristics of the fluid 18 being used, the size of the material being used as a workpiece 14, the height of fluid in the feed line 20, as well as any other factor that is desired to be used in conjunction with the apparatus 10.

Figure 2:
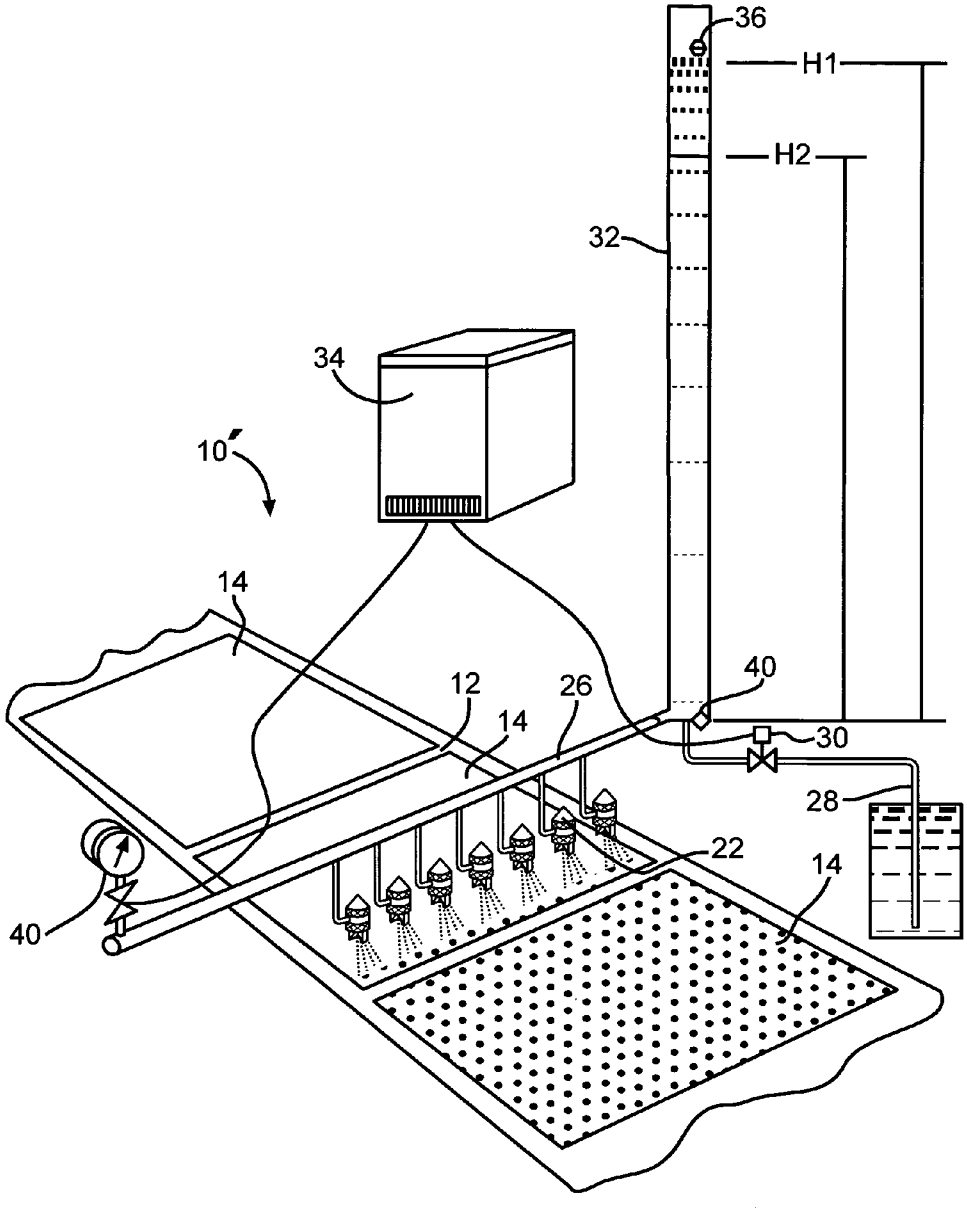
FIG. 2 is a perspective view of a fluid dispensing apparatus according to a second embodiment of the invention.

An alternate embodiment of the invention is illustrated in FIG. 2. In the alternate embodiment, the reservoir is implemented as a vertical tube 32 instead of the large suspended reservoir tank 14. Since the horizontal cross-section of the vertical tube 32 is less than that of the reservoir 16, it is anticipated that the measurement of the fluid height can be more accurately quantified and controlled. As described below, the fluid height can be measured before (H1) and after (H2) a dispensing operation. However, it can be appreciated that this step would only take place if refilling is deferred until after H2 is measured. Alternatively, refilling could be continuous and a controller 34 could activate the dispensing mechanism when it detects that H1 is met. The difference in the fluid heights is then used to determine the volume of fluid 18 dispensed during the dispensing operation. Depending on whether the amount of fluid 18 dispensed was within the design parameters, the vertical tube 32 could be refilled to a greater or lesser height H1 to account for the dispensed amount variation (described below). It is preferred that the vertical tube 32 also be connected to a fluid supply line 28 for refilling the tube 32. A solenoid valve 30 is preferably positioned between the tube 32 and the fluid supply source (not shown) to control the amount of refilling. The fluid supply line 28 can be connected to the base of the vertical tube 32 or at any point along the vertical tube 32. Unlike the elevated reservoir 14, the supply source that feeds the supply line 28 would not have to be positioned at the same or higher elevation. The solenoid valve 30 can then be operated in conjunction with a controller 34 to monitor and control the amount of fluid 18 used to replenish the vertical tube 32. The spraying operation of the alternate embodiment of the invention is substantially the same as that described in conjunction with the first alternate embodiment. However, it can be appreciated that the supply line 28 could continuously feed either the reservoir 16 or tube 32 rather than as an intermittent refilling step.

The amount of fluid 18 dispensed will vary with the starting height H1 of the fluid 18 in the feed tube 20 or reservoir 16. The pressure applied to the fluid 18 at the spray mechanism 22 is proportional to the density of the fluid 18, the height H1 of the fluid column and the pull of gravity. When the spray mechanism 22 is activated for a fixed period of time, a certain amount of fluid 18 will be dispensed based on those conditions, as well as the orifice size of the spray mechanism 22. Thus, the amount of fluid 18 dispensed can be calculated based on the fluid drop in the reservoir 16 or tube 32. For example, the height difference (H1−H2) in the reservoir 16 or tube 32 from an initial (pre-spray) state to a secondary (post-spray) state multiplied by the cross-sectional area of the reservoir 16 or tube 32 (area—A) will give the amount of fluid used per cycle. Thus:

$$((H1-H2)\times A)/\#\text{ of cycles}=\text{Average fluid consumption per cycle of operation}$$

Since the cross section of the tube 32 is considerably less than that of the reservoir 16, calculations that are performed using the tube configuration 10' as opposed to the reservoir configuration 10 will generally yield more accurate results using fewer number of machine cycles in the calculation for average fluid consumption per cycle of operation. Alternatively stated, the value of H1−H2 will be larger for smaller cross-sectional areas (the fluid drop will be greater in the tube 32 than in the reservoir 16 for the same volume of fluid consumption). If the height of the fluid reservoir 16 or tube 32 is fixed, the elevation of the spray mechanism 22 is fixed, and if the level H1 of fluid 18 in the reservoir is maintained, then the distance from the spray mechanism 22 to the top of the fluid (column height—H1) is also a constant. Since the pull of gravity is constant, the fluid pressure applied to the spray mechanism 22 will also be constant. Having a generally constant and generally consistent pressure at the spray mechanism 22 addresses some of the limitations with the prior art methods of fluid dispensing.

Additionally, measuring the amount of fluid 18 dispensed per cycle will allow the user to determine whether the proper amount of fluid 18 is being used for the application the mechanism 10 is being used for. In the preferred embodiment, the fluid 18 is a catalyst as described above. For certain applications, controlling the amount of fluid 18 dispensed is important to the process of forming a interior panel for a vehicle. By controlling the amount of catalyst applied to a workpiece 14, the more consistently a product can be produced.

A controller 34 can also be used in conjunction with the apparatus 10 and 10' according to the invention. The controller 34 could be programmed to monitor and control operational parameters, such as fluid pressure or fluid dispensed per cycle. Implementing a controller 34 with the apparatus 10 and 10', could allow the apparatus 10 and 10' to correct the output of the apparatus should a measured quantity be outside of the design parameters. Design parameters could be a specific pressure, a range of pressures, a specific amount of fluid used, a range of amounts of fluid used, as well as any other quantification for measuring the fluid consumption during operation of the apparatus. If the measured quantity is outside design parameters, the controller can adapt the operation of the system. For example, if the downstream pressure of the fluid 18 is lower than desired, the starting height H1 of the fluid 18 could be increased to raise the output pressure of the fluid 18. If the pressure is too high, the starting height H1 of the fluid 18 in the reservoir 16 or tube 32 could be lowered by refilling the reservoir 16 or tube 32 to a lower height than the previous starting fluid height H1. This process can be repeated through several operational cycles with the controller 34 allowing a higher or lower amount of fluid 18 to be used to refill the reservoir 16 or tube 32 until a fluid pressure (or amount of fluid dispensed) is within design limits. To control the amount of fluid 18 that is used to replenish the reservoir 16 or tube 32, it is preferred that the controller 34 be adapted to control a (normally closed) solenoid valve 30. The solenoid valve 30 is preferably connected between the fluid supply line 28 and the reservoir 16 or tube 32. The controller 34 can then operate the solenoid 30 for a period of time to allow the proper amount of fluid 18 to be replaced in the reservoir 16 or tube 32. The controller 34 is also preferably connected to a sensor 36 in the reservoir 16 or tube 32 that allows the controller 34 to detect the height of the fluid therein. The fluid height sensor 36 can be a float switch, level sensor, infrared eye, or any other suitable sensing mechanism. Also, the fluid height sensor 36 could be used to alert users if the fluid exceeds a certain amount such that the reservoir 16 or tube 32 is nearing an overflow state. Thus, the controller 34 can control refilling of the reservoir 16 or tube 32 by the amount of time the fluid supply line 28 is open, the height of the fluid 18, or the pressure at the spray mechanism 22. Alternatively, the pressure and height of fluid could be varied by positioning the reservoir 16 on a movable slide device such that the controller 34 (or manual operation) could reposition the reservoir 16 to achieve the desired fluid pressure. This alternate embodiment could also be used without a per-cycle refilling step and adjusting the reservoir height would be used to control the fluid pressure. It is preferred that the tube 32 be fixed and the pressure control be accomplished by varying the height of the fluid within the tube 32.

In a preferred pressure detection scheme, a low pressure transducer 40 can be mounted at the bottom of the vertical tube 32. It is further preferred that the transducer 40 be positioned at substantially the same elevation as the spray mechanism 22. The controller 34 could be used to take readings from the transducer 40 prior to and after each period of fluid dispensing. Although the transducer 40 is shown at two locations, it is preferred that a single transducer is used. The transducer 40 could be positioned at either indicated location and is also preferably connected to the controller 34. The solenoid valve 30 would be used, preferably after all the readings and measurements were taken and calculated, to replenish the vertical tube 32 (or reservoir 16). Additionally, the transducer 40 could also be used to take continuous measurements so that the controller 34 can make continuous calculations to the amount of fluid 18 being consumed during the dispensing process. It is preferred that continuous readings are taken during the refilling process such that the controller 34 can shut off the valve 30 when the appropriate fluid amount (H1) is reached. In a preferred embodiment, the controller 34 can also control the speed of the conveyor 12 in conjunction with controlling the spray mechanism 22 to allow the proper spray distribution to be applied to the workpieces 14 while simultaneously controlling the amount of fluid 18 being dispensed.

The controller 34 operating program can also include an algorithm programmed to monitor the fluid consumption and other design parameters. It is preferred that the controller algorithm be implemented in conjunction with the components described above. However, it can be appreciated that the embodiments of the invention can be practiced with a greater or lesser amount of components to dispense fluid 18 onto a workpiece. The algorithm is preferably programmed with a value or range of values for the amount of fluid 18 dispensed per cycle of operation of the apparatus 10 and 10'. Using the various measuring devices to provide feedback, the controller 34 can adapt the system to provide the workpiece 14 with the desired amount of fluid 18. After a number of cycles, the controller 34 would eventually converge upon the optimal filling height H1 of the reservoir 16 or tube 32 in order to dispense an amount of fluid 18 that is within the design range of the apparatus 10 and 10'. It is preferred that the feedback system continue to operate even after the optimal starting fill height H1 has been determined in order to maintain the proper level of fluid height in the reservoir 16 or tube 32. Particularly, this could be important if a downstream change occurs. For example, if the spray mechanism 22 orifices clog with the fluid 18, the controller 34 can detect that not enough fluid 18 is reaching the workpiece 14 and will increase the amount of fluid 18 in the reservoir 16 or tube 32 so that the desired amount of fluid 18 is dispensed. Alternatively, the controller 34 could be programmed to alert operating personnel if the fluid pressure falls outside design parameters too frequently or at too high or low a value.

Figure 3:
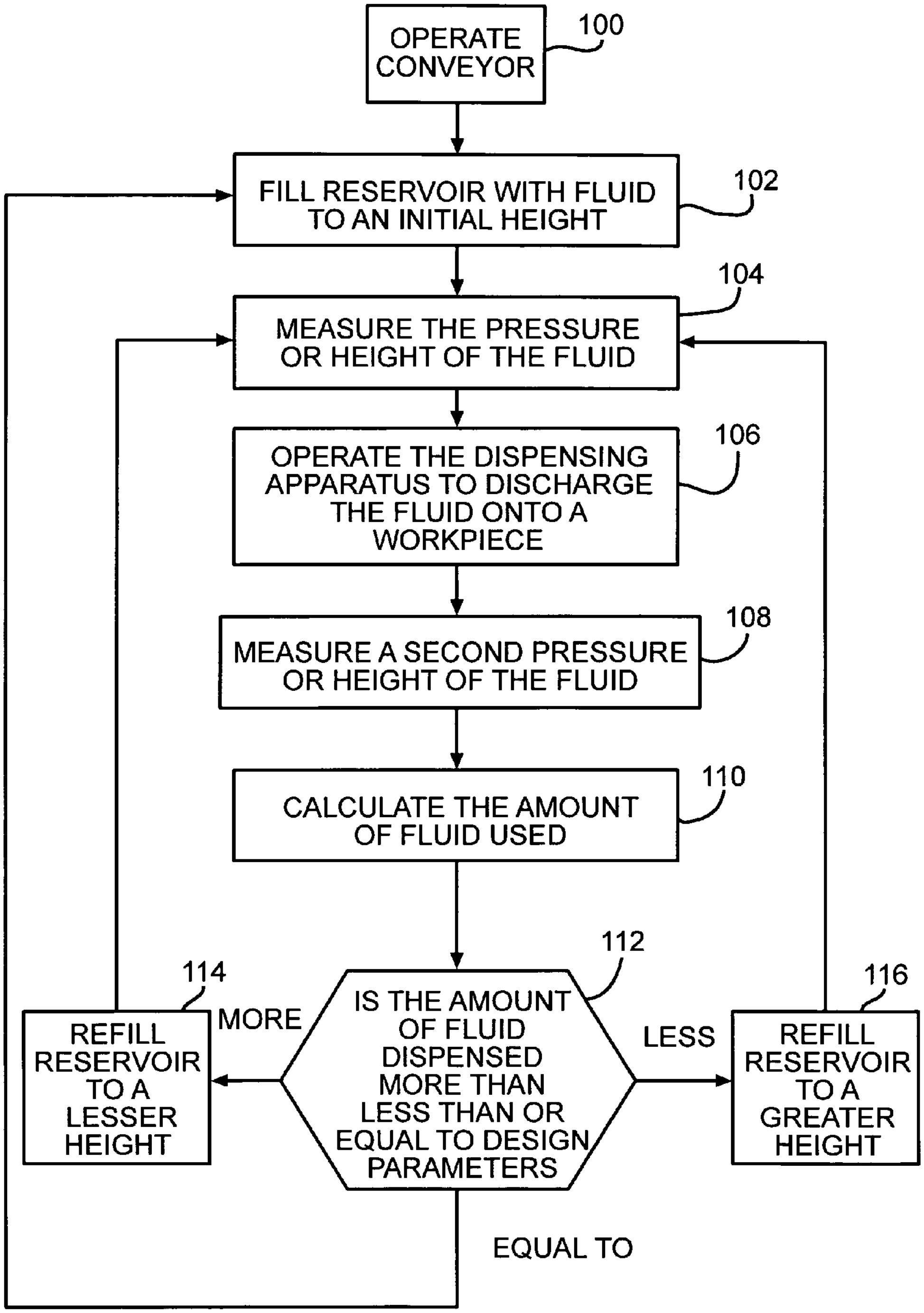
FIG. 3 is a flow diagram of the operating process according to the fluid dispensing apparatus of the present invention.

Illustrated in FIG. 3 is a flow diagram of the operating process according to the present invention. In a first step 100, a conveyor for moving workpieces into contact with a dispensing apparatus is activated. In a second step 102, a provided reservoir is filled with fluid to an initial height. In a third step 104, at least one of a first fluid pressure at the spray mechanism and first fluid height is measured. In a fourth step, 106, the dispensing mechanism is operated to dispense an amount of the fluid. In a fifth step 108, at least one of a second fluid pressure at the spray mechanism and second fluid height is measured. In a sixth step 110, the amount of fluid dispensed is calculated using any of the methods described above. In a seventh step 112, it is determined whether the amount of fluid dispensed is within the design parameters, is greater than the design parameters, or is less than the design parameters. If the amount of fluid dispensed is within design parameters, then the fluid is refilled to the initial height according to step 102. If the amount of fluid dispensed is greater than desired, then in an eighth step 114, the reservoir is refilled a lesser amount. In the reservoir and fluid height system, the reservoir is refilled to a lesser height. If the amount of fluid dispensed is less than desired, then in a ninth step 116, the reservoir is refilled to a greater amount. In the reservoir and fluid height system, the reservoir is refilled to a greater height. Regardless of whether the eighth step 114 or ninth step 116 is taken, the pressure or height of the fluid is measured according to the third step 104. It is preferred that the process is repeated until it is desired that the operation be stopped and no further workpieces receive the fluid according to the dispensing operation.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for dispensing fluid for forming a bond between plies of a vehicle interior panel comprising:
- providing a reservoir containing an amount of fluid;
- providing a spray mechanism for dispensing the fluid from the reservoir;
- positioning the fluid within the reservoir at an initial height above the spray mechanism;
- operating a controller to determine the initial height of the fluid;
- operating the spray mechanism to dispense an amount of the fluid wherein the amount of dispensed fluid is regulated by hydrostatic pressure corresponding to the height of the fluid;
- operating the controller to determine a second height of the fluid; and
- calculating the amount of fluid used during the dispensing operation.

2. The method defined in claim 1 further comprising a valve operatively connected to the controller wherein the valve is positioned between the reservoir and a source of the fluid; and
- the valve is operated by the controller to refill the reservoir.

3. The method defined in claim 2 wherein the valve is operated by the controller to one of:
- refill the reservoir to an amount greater than the initial height of fluid when the amount of fluid dispensed is less than a pre-set amount;
- refill the reservoir to an amount less than the initial height of the fluid when the amount of fluid dispensed is greater than the pre-set amount; and
- refill the reservoir to the same amount as the initial height of the fluid when the amount of fluid dispensed is equal to the pre-set amount.

4. The method defined in claim 1 wherein the initial height of the fluid is checked prior to each dispensing cycle.

5. The method defined in claim 1 wherein the controller determines the fluid height based on a density of the fluid, a fluid pressure at the spray mechanism, and a gravitational force constant.

6. The method defined in claim 1 wherein the vehicle interior panel is a first vehicle headliner ply having a polyurethane adhesive applied thereto; and
- the fluid is a catalyst that interacts with the adhesive to form a bond with a second headliner ply.

7. A method for dispensing a fluid for forming a bond between plies of a vehicle panel comprising:
- providing a tube containing an amount of fluid;
- providing a source of fluid for replenishing the fluid in the tube;
- controlling the flow of fluid between the source of fluid and the tube;
- providing a spray mechanism in fluid communication with the tube, the spray mechanism being configured to dispense fluid from the tube;
- providing a controller;
- operating the controller to determine the initial height of fluid in the tube;
- providing a first vehicle panel;
- operating the spray mechanism to dispense an amount of the fluid on the first vehicle interior panel; and
- providing a second vehicle panel substantially aligned with the first vehicle panel to join the panels together.

8. The method defined in claim 7 further comprising the steps of:
- operating the controller to determine a second height of the fluid in the tube; and
- calculating the amount of fluid dispensed during the dispensing operation by comparing the initial height of the fluid to the second height of the fluid.

9. The method defined in claim 8 further comprising the step of:
- determining whether the desired amount of fluid was dispensed.

10. The method defined in claim 9 further comprising the step of:
- refilling the tube from the source to at least one of a same, higher, and lower height than an initial fluid height based on the determination of the amount of fluid dispensed.

11. A method for dispensing fluid onto a surface comprising:
- providing a reservoir containing an amount of fluid;
- providing a spray mechanism for dispensing the fluid from the reservoir;
- positioning the fluid within the reservoir at an initial height above the spray mechanism;
- operating a controller to determine the initial height of the fluid;
- providing a valve operatively connected to the controller wherein the valve is positioned between the reservoir and a source of the fluid;
- operating the spray mechanism to dispense an amount of the fluid;
- operating the controller to determine a second height of the fluid;
- calculating the amount of fluid used during the dispensing operation; and
- operating the valve to refill the reservoir to refill the reservoir to one of:
  - an amount greater than the initial height of fluid when the amount of fluid dispensed is less than a pre-set amount;
  - an amount less than the initial height of the fluid when the amount of fluid dispensed is greater than the pre-set amount; and
  - the same amount as the initial height of the fluid when the amount of fluid dispensed is equal to the pre-set amount.

12. The method defined in claim 11 wherein the initial height of the fluid is checked prior to each dispensing cycle.

13. The method defined in claim 11 wherein the controller determines the fluid height based on a density of the fluid, a fluid pressure at the spray mechanism, and a gravitational force constant.

14. The method defined in claim 11 wherein the vehicle interior panel is a first vehicle headliner ply having a polyurethane adhesive applied thereto; and
- the fluid is a catalyst that interacts with the adhesive to form a bond with a second headliner ply.

15. A method for dispensing fluid onto a surface comprising:

providing a reservoir containing an amount of fluid;

providing a spray mechanism for dispensing the fluid from the reservoir;

positioning the fluid within the reservoir at an initial height above the spray mechanism;

operating a controller to determine the initial height of the fluid;

operating the spray mechanism to dispense an amount of the fluid;

operating the controller to determine a second height of the fluid; and calculating the amount of fluid used during the dispensing operation;

wherein the controller determines the fluid height based on a density of the fluid, a fluid pressure at the spray mechanism, and a gravitational force constant.

16. The method defined in claim 15 further comprising a valve operatively connected to the controller wherein the valve is positioned between the reservoir and a source of the fluid; and the valve is operated by the controller to refill the reservoir.

17. The method defined in claim 16 wherein the valve is operated by the controller to one of:

refill the reservoir to an amount greater than the initial height of fluid when the amount of fluid dispensed is less than a pre-set amount;

refill the reservoir to an amount less than the initial height of the fluid when the amount of fluid dispensed is greater than the pre-set amount; and refill the reservoir to the same amount as the initial height of the fluid when the amount of fluid dispensed is equal to the pre-set amount.

18. A method for dispensing fluid for forming a bond between plies of a vehicle interior panel comprising:

providing a reservoir containing an amount of fluid;

providing a spray mechanism for dispensing the fluid from the reservoir;

positioning the fluid within the reservoir at an initial height above the spray mechanism;

operating a controller to determine the initial height of the fluid;

operating the spray mechanism to dispense an amount of the fluid;

operating the controller to determine a second height of the fluid; and calculating the amount of fluid used during the dispensing operation;

wherein the vehicle interior panel is a first vehicle headliner ply having a polyurethane adhesive applied thereto, and the fluid is a catalyst that interacts with the adhesive to form a bond with a second headliner ply.

19. The method defined in claim 18 further comprising a valve operatively connected to the controller wherein the valve is positioned between the reservoir and a source of the fluid; and the valve is operated by the controller to refill the reservoir.

20. The method defined in claim 19 wherein the valve is operated by the controller to one of:

refill the reservoir to an amount greater than the initial height of fluid when the amount of fluid dispensed is less than a pre-set amount;

refill the reservoir to an amount less than the initial height of the fluid when the amount of fluid dispensed is greater than the pre-set amount; and refill the reservoir to the same amount as the initial height of the fluid when the amount of fluid dispensed is equal to the pre-set amount.

* * * * *